Nov. 12, 1935.  A. J. MYHREN ET AL  2,020,902
MANUFACTURE OF ZINC SULPHIDE PIGMENT
Filed Dec. 15, 1933
Fig. 1,
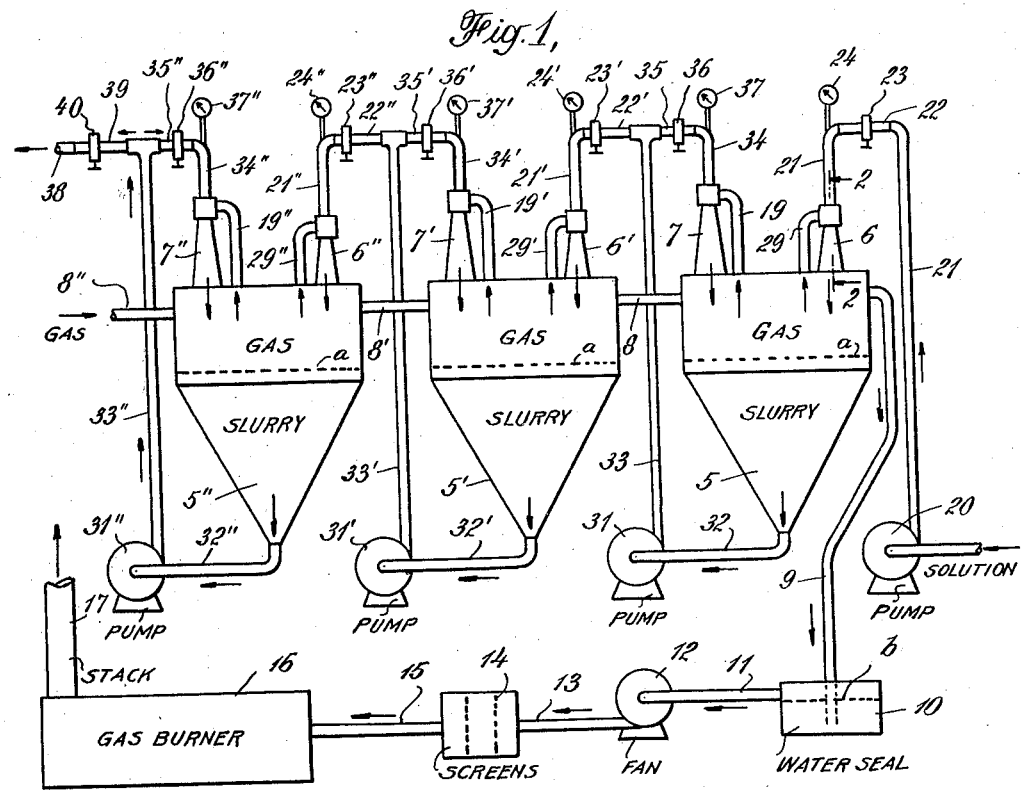
Fig. 2,
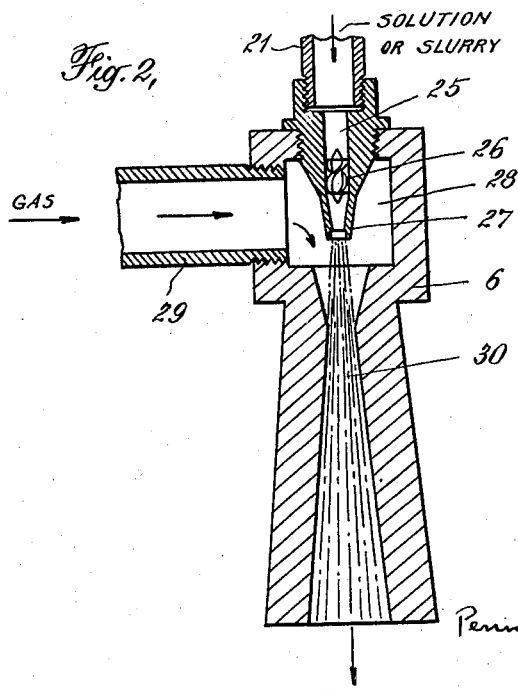
INVENTORS
ARNE J. MYHREN
BYRON. MARQUIS
BY
Pennie, Davis, Marvin & Edmonds
ATTORNEYS Patented Nov. 12, 1935

2,020,902

UNITED STATES PATENT OFFICE 2,020,902

MANUFACTURE OF ZINC SULPHIDE PIGMENT

Arne J. Myhren and Byron Marquis, Palmerton, Pa., assignors to The New Jersey Zinc Company, New York, N. Y., a corporation of New Jersey Application December 15, 1933, Serial No. 702,580

14 Claims. (Cl. 23—135)

The present invention relates to the manufacture of zinc sulphide pigment from a crude zinc sulphide precipitate obtained by the reaction of hydrogen sulphide gas with zinc sulphate solution. Pigment is produced from such a crude zinc sulphide precipitate by the following conventional steps: (1) Aging in the mother liquor of the precipitate; (2) removal of the precipitate from the mother liquor, by filtration or settling, followed by washing and neutralization of the residual acid with alkaline materials; (3) filtering; (4) drying of filter cake; (5) calcination; (6) quenching in water, (7) wet grinding, (8) filter-pressing; (9) drying and disintegration. A finished zinc sulphide pigment is obtained after the conclusion of these finishing operations.

We have found that the pigmentary properties of the finished zinc sulphide pigment are affected by the settling properties of the slurry of crude precipitate. Thus, slow settling slurries yield a zinc sulphide pigment with higher tinting strength than rapid settling slurries, other things being equal. The present invention contemplates an improved control of the manufacture by precipitation of zinc sulphide pigment by controlling the settling properties of the crude precipitate.

The settling properties of the crude precipitate are determined as folows:

A sample of 500 cubic centimeters of the slurry of crude precipitate is taken before aging. This slurry is observed for 10 minutes in a graduated cylinder. The vessel used should not be so narrow or so shallow as to hinder the settling to a substantial extent. The volume (depth) of the clear supernatant liquor formed above the settling precipitate at the end of 10 minutes is measured. The rate at which the crude precipitate settles is an indication of the type of pigment that will be obtained therefrom by normal processing methods. Thus a crude precipitate that settles so as to yield 30 to 60 cubic centimeters of clear supernatant liquor in a 500 c. c. graduate of approximate diameter of 1⅞ inches filled to a depth of about 11 inches (a supernatant liquor depth of about 0.66 to 1.32 inches) will yield after normal processing a zinc sulphide pigment of high tinting strength. On the other hand a crude precipitate that settles so as to yield from 90 to 250 cubic centimeters of clear supernatant liquor in a 500 c. c. graduate of approximate diameter of 1⅞ inches filled to a depth of about 11 inches (a supernatant liquor depth of about 2 to 5.4 inches) will yield after normal processing a pigment that is deficient in tinting strength. The slow settling crude precipitates yield on drying a hard crude cake. The rapid settling crude precipitates yield on drying a soft crude cake. In case of extremely slow settling, the dry crude cake obtained is so hard that difficulty is encountered during the grinding of the calcined product, and under certain circumstances, the product obtained from extremely hard crude cakes may thus become discolored during grinding, with resultant loss in whiteness and brightness. For this reason it is desirable under certain circumstances to avoid the formation of very slow settling crude precipitates as well as the formation of crude precipitates that settle very rapidly. As hereinafter explained, the present invention contemplates a method and means by which the desired settling velocity of a crude precipitate can be obtained.

In the process of the invention the zinc sulphate solution and hydrogen sulphide gas may advantageously be mixed in Venturi precipitators, that is to say eductors of Venturi tube type, so constructed and operated that the zinc sulphate solution is brought in the form of thin films into contact with relatively large volumes of hydrogen sulphide gas. The Venturi precipitators preferably discharge the reacting zinc sulphate solution and hydrogen sulphide gas into vats, closed so as to retain the gas. The reaction between the hydrogen sulphide and the zinc sulphate is facilitated and accelerated by the intimacy of contact so obtained. The limiting factor of the velocity of this reaction is the rate at which hydrogen sulphide is dissolved in the zinc sulphate solution. The greater the surface of contact between hydrogen sulphide gas and zinc sulphate solution, the more rapidly will the hydrogen sulphide dissolve in the zinc sulphate solution. Once the solution of hydrogen sulphide in the zinc sulphate solution has occurred, the formation of sulphide ions occurs with great rapidity and the reaction of sulphide ions with the zinc ions already in the solution to form zinc sulphide precipitate likewise occurs with great rapidity.

A further feature of the process is that the precipitation may likewise be accelerated by keeping the zinc sulphate solution cool (at or near room temperature for example) since hydrogen sulphide is more soluble in cold aqueous solutions than in hot aqueous solutions.

The invention may be effectively practiced in the apparatus shown in the accompanying drawing, in which:

Fig. 1 is a diagrammatic elevation of a suitable apparatus for the practice of the invention.

Fig. 2 is a section on the line 2—2 of Fig. 1, showing in detail the construction of the Venturi tube eductor 6, and likewise of the eductors 6', 6'', 7, 7' and 7'' in Fig. 1.

The apparatus illustrated in the drawing comprises three tanks 5, 5', 5'' (arranged in series), of circular cross-section and with conical bottoms, each tank being provided with two Venturi tube eductors 6 and 7, 6' and 7' and 6'' and 7'', respectively. The series of tanks is provided with a gas inlet pipe 8'' (entering the top portion of tank 5'') and a gas outlet pipe 9 (discharging from tank 5). A gas pipe 8' connects the top portions of tank 5'' and 5' and a gas pipe 8 connects the top portions of tanks 5' and 5. The system of pipes 8'', 8', 8 and 9 connects the tanks in series at points above the normal level (a) of liquid or slurry therein in such fashion that gas can flow freely through the series of tanks.

The gas outlet pipe 9 dips below the liquid-level (b) in a water seal 10. The gas-space above the liquid-level (b) in the water seal 10 is connected by a pipe 11 with the suction side of a fan 12. The pressure side of the fan 12 is connected by a pipe 13 with a screen-box 14, which contains metal screens (preferably made of a metal of high heat conductivity such as copper) set across the path of the gases therethrough. The screen box 14 is connected by a pipe 15 to a gas burner 16, provided with a stack 17.

The metal screens in the box 14 prevent back-firing of the flame in the gas burner 16. The water seal 10 is of utility not only as a further safe-guard against back-firing, but also as a means of regulating the effective suction of the fan 12. The effective suction of the fan 12 on the outlet pipe 9 may be increased by lowering the water-level (b) in the water seal 10, and decreased by raising the water level. Moreover, the water seal 10 prevents the entrance of air into the tank 5 when the fan 12 is shut down, for example for the purpose of attaching a spare fan.

The tanks 5, 5' and 5'' are provided with pumps for liquid and/or slurry transport, and pipe lines for liquid or slurry are appropriately connected with the pumps, tanks and Venturi tube eductors in such fashion that liquid and/or slurry can be transported through the series of tanks and likewise partly recirculated in the individual tanks, while being brought into intimate contact with gas traversing the series of tanks in general countercurrent with the liquid and/or slurry. Each of the six Venturi tube eductors (6, 7, 6', 7', 6'' and 7'') is arranged to recirculate gas through the tank with which it is operatively associated, while intimately mixing the gas with the liquid and/or slurry. The Venturi tube eductor 6 introduces liquid into the system by discharging it into tank 5. The Venturi tube eductors 7, 7' and 7'' serve to recirculate liquid or slurry through the tanks with which they are connected (through tanks 5, 5' and 5'', respectively). The Venturi tube eductors 6' and 6'' serve to convey liquid or slurry from one tank to the next tank in the series. Thus, Venturi tube eductor 6' serves to convey liquid or slurry (withdrawn from tank 5) into tank 5'; and Venturi tube eductor 6'' serves to convey liquid or slurry (withdrawn from tank 5') into tank 5''.

The apparatus shown in Fig. 1 will now be described in greater detail:

A pump 20 is connected on its suction side to a source of liquid (not shown). On its pressure side, the pump 20 is connected with a pipe 21, part of which consists of the rubber hose segment 22, provided with a pinch valve 23. The pipe 21 leads to the Venturi tube eductor 6. Between the pinch valve 23 and the eductor 6, the pipe 21 is provided with a pressure gauge 24, for indicating the rate of delivery of liquor to the Venturi tube eductor 6.

The structure of the Venturi tube eductor 6 will be more clearly understood by reference to Fig. 2. The pipe 21 connects with a duct 25, in which is placed a spiral baffle 26. The duct 25 terminates in a discharge nozzle 27 in a gas chamber 28, connected by a pipe 29 to the upper portion of the tank 5 (i. e., the portion of the tank 5 above the line of normal slurry or liquid level a therein). The nozzle 27 is placed concentrically with a Venturi tube 30 communicating with the gas-chamber 28 at a point opposite the nozzle 27.

Referring again to Fig. 1, the suction side of a pump 31 is connected by a pipe 32 to the discharge orifice at the tip of the conical bottom of tank 5. The pressure side of pump 31 is connected to a pipe 33, dividing at its upper end into a branch pipe 34 leading back into the tank 5 through the Venturi tube eductor 7, and into branch pipe 21', leading into the Venturi tube eductor 6'. The branch pipe 34 is provided with the rubber hose segment 35, equipped with the pinch valve 36, and is also provided with the pressure gauge 37, between the pinch valve 36 and the Venturi tube eductor 7. The branch pipe 21' is likewise provided with a rubber hose section 22' equipped with a pinch valve 23', and provided with a pressure gauge 24' between the pinch valve 23' and the Venturi tube eductor 6'. It will be readily understood that the relative amounts of liquid (or slurry) entering the branch pipes 34 and 21', respectively, can be appropriately regulated, as hereinafter more particularly explained, by appropriate adjustment of the pinch valves 23' and 36, respectively; and that the relative amounts of liquid or slurry flowing through the pipes 21' and 34 can be determined at any time by comparing the reading of the gauges 24' and 37.

The structure of the Venturi tube eductors 6', 7, 7' etc. is the same as that of Venturi tube eductor 6 hereinbefore described. Pipe 19, 19' and 19'' connect the upper portion of the tanks 5, 5' and 5'' with the gas chamber of the Venturi tube eductors 7, 7' and 7'', respectively.

The structure and arrangement of the pump 31', pipes 32' and 33', branch pipe 34' with the rubber hose segment 35', pinch valve 36' and gauge 37', branch pipe 21'' with the rubber hose segment 22'', pinch valve 23'' and gauge 24'', and the Venturi tube eductors 7' and 6'', are the same with respect to tanks 5' and 5'' as the structure and arrangement of the correspondingly identified elements described with respect to tanks 5 and 5'.

The pump 31'' is connected on its suction side to the pipe 32'' communicating with the discharge orifice in the conical bottom of the tank 5''. The pressure side of the pump 31'' is connected to the pipe 33'', which divides into the branch pipe 34'' (connecting with the Venturi tube eductor 7'') and branch pipe 38, which serves as an outlet for the discharge of liquid or slurry from the system. The branch pipe 34″ is provided with the hose segment 35″, having the pinch valve 36″, and with the pressure gauge 37″. The discharge pipe 38 is provided with a hose segment 39, equipped with a pinch valve 40. It will be understood that the relative amounts of liquid or slurry discharged through the pipe 38 and returned to the tank 5″ through the Venturi tube eductor 7″ can be regulated by appropriate adjustment of the valves 40 and 36″, and that the amount of liquid or slurry entering the Venturi tube eductor 7″ can be determined at any time by reading the gauge 37″.

The apparatus shown in the drawing is operated as follows for producing a zinc sulphide precipitate by the reaction of hydrogen sulphide and zinc sulphate solution:

Hydrogen sulphide is introduced into the series of tanks through the inlet 8″, and circulated in succession through tank 5″, pipe 8′, tank 5′, pipe 8, tank 5, outlet pipe 9 and water-seal 10 by the suction produced by the fan 12. The effective suction of the fan 12 can be adjusted and regulated by suitable adjustment of the water-level b in the water-seal 10. It will be understood that the absorption of hydrogen sulphide by solution in, and reaction with, the zinc sulphate solution likewise tends to draw gas into the system through the pipe 8″ by suction. The water-seal 10 prevents air from entering the system when the fan 12 is shut down for any reason, as for example for the purpose of attaching a spare fan to the gas outlet line 9.

The fan 12 forces the gas through the line 13, the screen box 14 and the line 15 to the gas burner 16. The products of combustion (e. g. sulphur dioxide) are removed from the burner 16 by the stack 17. Back-firing of flame from the burner 16 into the system is guarded against by metal screens (made of a metal of high heat conductivity, e. g. copper) placed in the path of the gases in screen-box 14. The water-seal 10 is a further safe guard against back-firing.

Purified zinc sulphate solution is introduced (preferably continuously) into the system by pump 20, which delivers solution to the Venturi tube eductor 6 through the pipe 21. The amount of solution transported by the pump 20 through the pipe 21 can be regulated by adjustment of the pinch valve 23 on the hose segment 22. The rate of flow of solution into the Venturi tube eductor 6 is indicated by the pressure gauge 24 connected in the pipe line 21 at a point between the Venturi tube eductor 6 and the pinch valve 23.

From the pipe 21, the solution enters the duct 25 of the Venturi tube eductor 6. A swirling motion is imparted to the solution flowing through the duct 25 by the spiral baffle 26. The swirling stream of solution then passes through the nozzle 27 in the form of a conical expanding jet into the gas chamber 28. The jet traverses the gas-chamber 28 and enters the Venturi tube 30, which is concentric and coaxial with the nozzle 27. In the Venturi tube 30, the velocity of the jet of solution is sufficiently increased by the constriction of the Venturi tube to create suction in the gas chamber 28. Hydrogen sulphide gas is thus withdrawn from the gas-chamber 28 by the suction of the Venturi tube and by entrainment in the jet of solution. The suction in the gas-chamber 28 draws hydrogen sulphide gas through the pipe 29 into the gas-chamber from the upper part of the tank 5. The Venturi tube 30 discharges this gas, together with a slurry of zinc sulphide precipitate formed by reaction of the gas with the solution, into the tank 5. The gas is brought into intimate contact with the solution in the form of thin films and small droplets in the Venturi tube 30 so that the reaction between hydrogen sulphide and zinc sulphate is initiated, with formation of a slurry of zinc sulphide, zinc sulphate and sulphuric acid solution. The Venturi tube eductor is preferably so operated as to entrain with the solution a volume of gas greatly in excess of the volume of solution; for example, the volume of hydrogen sulphide gas carried through the Venturi tube eductor by the solution may be from 25 to 50 times the volume of the solution, or even more.

The slurry charged into the tank 5 through the Venturi tube eductor 6 is withdrawn from the orifice in the conical bottom of the tank through the pipe 32 by the pump 31, which forces the slurry through the pipe 33, into the branch pipes 34 and 21′. The relative amounts of slurry flowing into these two branch pipes are regulated by appropriate adjustments of the pinch valves 36 and 23′; the pressure gauges 37 and 24′, respectively, indicate the prevailing pressures and thus the rates of flow in these two branch pipes. The slurry entering the Venturi tube eductor 7 is mixed therein with hydrogen sulphide gas taken from the tank 5, and then returned to tank 5. The Venturi tube eductor 7 functions with respect to mixing the gas and slurry in the same manner as the Venturi tube eductor 6. The slurry entering the branch pipe 21′ passes into the Venturi tube eductor 6′, which functions in the same manner as Venturi tube eductor 6, with respect to mixing the slurry with gas (except that, as will be obvious from the figure, the Venturi tube eductor 6′ draws gas through its gas-pipe 29′ from the tank 5′). The Venturi tube eductor 6′ discharges slurry into tank 5′ and thus transports slurry from tank 5 to tank 5′; while the Venturi tube eductor 7 returns slurry to tank 5.

It will be understood that in order to secure a desirable uniform and constant flow of slurry through the apparatus, the Venturi tube eductor 6′ must transfer to the tank 5′ an amount of slurry corresponding to that entering the tank 5 through the Venturi tube eductor 6. The rate of discharge of Venturi tube eductor 6′ may be suitably controlled with this object in view by appropriate adjustment of the pinch valves 36 and 23′.

It will also be understood that the capacity of the pump 31 must in consequence be adequate to pump all the slurry supplied to tank 5 by pump 20 plus the amount of slurry returned to tank 5 by the Venturi tube eductor 7.

The slurry charged into tank 5′ by the Venturi tube eductor 6′ is recirculated in tank 5′ through the Venturi tube eductor 7′ and transported to tank 5″ through the Venturi tube eductor 6″ in a manner similar to that just described.

Slurry is withdrawn from tank 5″ by the pump 31″ through the line 32″, and pumped into the line 33″, whence it is in part discharged from the system through the line 38, and in part returned to tank 5″ through the Venturi tube eductor 7″. The ratio of the amount discharged through the line 38 to that returned to tank 5″ through Venturi tube eductor 7″ is appropriately controlled by proper adjustment of the pinch valves 36″ and 40. This adjustment is facilitated by the fact that the readings of pressure gauge 37″ are an indication of the rate at which slurry is supplied to the Venturi tube eductor 7″.

In order to secure uniform and continuous flow of slurry through the system, it will in general be desirable to adjust the amount of slurry discharged from the outlet 38 so that it corresponds to the amount of slurry fed into the system through the Venturi tube eductor 6.

In the practice of the invention in the apparatus illustrated in the drawing, it will generally be advantageous to recirculate the slurry at a rate that is a multiple of the rate at which slurry is transferred from tank to tank; for example, the ratio of volume of slurry recirculated to volume of slurry forwarded through the tanks may be 4:1, in case a ZnSO4 solution containing 30 grams Zn per liter is used. In consequence, it is advantageous to construct the recirculating Venturi tube eductors 7, 7′ and 7″ larger than the transporting Venturi tube eductors 6, 6′ and 6″; for example, the linear dimensions of 7, 7′ and 7″ may be twice those of 6, 6′ and 6″.

In producing a zinc sulphide precipitate as hereinbefore described, the apparatus must of course be constructed of acid resistant material on account of the formation of sulphuric acid by the reaction (ZnSO4+H2S=ZnS+H2SO4). Hard rubber, soft rubber, or steel lined with rubber are appropriate materials.

In a practical example of the invention carried out in the apparatus illustrated in the drawing, each of the precipitation tanks is 5′, 6″ in diameter, has an overall height of 7′, and the depth of the conical bottom of the tank is 5′. Each tank is adapted to contain from 150 to 200 gallons of zinc sulphate solution or slurry of precipitated zinc sulphide in zinc sulphate and sulphuric acid solution, leaving ample room for an atmosphere of hydrogen sulphide gas above the liquid level. The Venturi tube eductors are so operated that the precipitator 6 is supplied with 20 gallons of zinc sulphate solution per minute and the transferring precipitators 6′ and 6″ discharge corresponding amounts of slurry. The volume of feed entering the precipitators is controlled by adjusting the pinch valves in accordance with the pressure registered by the gauges in the downcomers leading to the precipitators. The recirculating precipitators 7, 7′ and 7″ recirculate about 80 gallons of slurry per minute. Each Venturi tube eductor entrains from 25 to 50 volumes (or more) of gas containing at least 50% of hydrogen sulphide gas for each volume of liquor or slurry. The gas introduced into the apparatus (pipe 8″) is substantially pure hydrogen sulphide (about 99.5% H2S), and the exiting or spent gas (pipe 9) contains from 50 to 75% hydrogen sulphide. The volume of exiting gas is of course very substantially smaller than the volume of gas introduced through pipe 8″, in consequence of the precipitating reaction, and since the only gases (other than hydrogen sulphide) entering the apparatus are relatively very small amounts of air, the efficiency of hydrogen sulphide consumption in the apparatus is about 99.5–98.5%. The zinc sulphate solution treated contains about 30 grams Zn per liter or about 75 grams ZnSO4 per liter. In this operation, with three tanks in series, the slurry is mixed with hydrogen sulphide gas in an eductor from ten to fifteen times before being discharged from the apparatus, and there is substantially no short-circuiting of solution through the apparatus without adequate mixing with hydrogen sulphide gas. The slurry discharged through the outlet 38 contains about 1.5 grams unprecipitated Zn per liter, and about 4.5% sulphuric acid. The elimination of ZnSO4 in the crude slurry as discharged from the precipitating system is thus 95% approximately. During the subsequent aging treatment lasting several hours in which the crude zinc sulphide precipitate is maintained in contact with the acid mother liquor, the elimination of zinc sulphate is increased to about 98% by reaction of the residual zinc sulphate with hydrogen sulphide gas adsorbed by the zinc sulphide particles and gradually desorbed during the aging.

The plant in question produces about five net tons zinc sulphide pigment per day. After aging treatment, the precipitate is separated from the mother liquor, dried, calcined and processed in a way similar to the finishing treatment of lithopone.

In accordance with the present invention, the settling velocity of the crude zinc sulphide precipitate and thus the pigmentary properties of the finished pigment are controlled by modifying the following factors:

1. The concentration of the hydrogen sulphide gas in the eductor receiving fresh solution, that is, where the first portion of the precipitate is formed. The greater this concentration of hydrogen sulphide gas, the slower the settling rate of the precipitate slurry. This concentration is the concentration of the exiting gas in a counter-current system as shown in the drawing. Concurrent of this concentration is obtained by regulating the efficiency of the hydrogen sulphide gas absorption. For example, with a concentration of 99.5% H2S in the gas entering the precipitating system and regulation of the gas absorption so as to give a concentration of 50% H2S in the exiting gas (at the eductor receiving fresh solution), the efficiency of the hydrogen sulphide gas absorption is approximately 99.5%. With regulation of the gas absorption so as to give a concentration of 75% H2S gas in the exiting gas (at the eductor receiving fresh solution), the efficiency of the hydrogen sulphide gas absorption is about 98.5%.

2. The temperature of the zinc sulphate liquor, which is the controlling factor of the temperature of the reaction. The higher the temperature of the liquor the faster the crude precipitate obtained therefrom settles.

3. The ratio between hydrogen sulphide gas and zinc sulphate solution in the Venturi precipitators. Since the reaction zone where the precipitation actually occurs is for the most part within the Venturi tube precipitators, the effective concentration of hydrogen sulphide gas is to a great extent measured by the ratio of gas volume to liquor volume in the Venturi precipitators. The higher the ratio of gas volume to liquor volume, the slower the settling of the crude precipitate and the greater the tinting strength of the finished zinc sulphide pigment obtained therefrom, other factors being the same. With zinc sulphate liquor containing 30 grams of zinc per liter and three precipitation tanks equipped with Venturi precipitators in the manner hereinbefore described, an appropriate ratio of gas volume to liquor volume will for example be between 25 and 50 (or more) to 1.

4. The ratio of gallonage forwarded to gallonage recirculated. The greater the proportion of recirculation, the faster the settling.

In general, any condition that tends to facilitate the precipitation reaction will tend at the same time, other factors being the same, to produce a slow settling material that will yield a finished zinc sulphide pigment with high tinting strength.

In controlling the operation by the application of the principles herein described, it should be noted that the control of the precipitation of the first moiety of zinc present in the liquor is the most important for determining the characteristics of the crude precipitate.

In practice, control of the settling rate is readily effected by regulating the gas concentration and the ratio of recirculation to forwarding. In the case of zinc sulphate solutions containing 30 grams zinc (Zn) per liter used in a system with three tanks, a ratio of 4 gallons recirculated liquor (slurry) to 1 gallon forwarded liquor (slurry) has been found appropriate to secure a desirable settling rate, when using Venturi tube eductors with a ratio of gas volume to liquor volume of 25–50 or more to 1.

We claim:

1. In the manufacture of zinc sulphide pigment by wet precipitation, in which a zinc sulphate solution containing about 30 grams of zinc per liter is brought into contact with hydrogen sulphide gas, the improvement which comprises providing a ratio of gas volume to liquor volume of between 25 and 50 to 1 for obtaining a crude zinc sulphide precipitate having a relatively slow settling rate.

2. In the manufacture of zinc sulphide pigment by wet precipitation, in which a zinc salt solution is brought into contact with hydrogen sulphide gas with recirculation of the resulting slurry, the improvement which comprises regulating the volume of slurry recirculated to the volume of slurry forwarded in the ratio of about 4 to 1.

3. In the manufacture of zinc sulphide pigment by wet precipitation, in which a zinc salt solution is brought into contact with hydrogen sulphide gas with repeated contact of the resulting slurry with hydrogen sulphide gas in a series of tanks through which the slurry is passed with recirculation of slurry in each tank, the improvement which comprises providing a ratio of gas volume to liquor volume of between 25 and 50 to 1, and regulating with respect to each tank the volume of slurry recirculated and the volume of slurry forwarded in the ratio of about 4 to 1.

4. In the manufacture of zinc sulphide pigment by wet precipitation, in which a cold zinc sulphate solution containing about 30 grams of zinc per liter is brought into contact with hydrogen sulphide gas with recirculation of the resulting slurry, the improvement which comprises regulating the volume of slurry recirculated to the volume of slurry forwarded in the ratio of about 4 to 1.

5. In the manufacture of zinc sulphide pigment by wet precipitation, in which a cold zinc sulphate solution containing about 30 grams of zinc per liter is brought into contact with hydrogen sulphide gas with repeated contact of the resulting slurry with hydrogen sulphide gas in a series of tanks through which the slurry is passed with recirculation of slurry in each tank, the improvement which comprises providing a ratio of gas volume to liquor volume of between 25 and 50 to 1, and regulating with respect to each tank the volume of slurry recirculated and the volume of slurry forwarded in the ration of about 4 to 1.

6. In the manufacture of zinc sulphide pigment by wet precipitation, in which a cold zinc sulphate solution containing about 30 grams of zinc per liter is brought into contact with hydrogen sulphide gas with repeated contact of the resulting slurry with hydrogen sulphide gas in a series of tanks through which the slurry is passed with recirculation of slurry in each tank, the improvement which comprises providing a ratio of gas volume to liquor volume of between 25 and 50 to 1, and regulating with respect to each tank the volume of slurry recirculated and the volume of slurry forwarded in the ratio of about 4 to 1, whereby the settling rate of the crude zinc sulphide precipitate is such that when 500 cc. of the slurry are left standing for 10 minutes in a cylindrical graduate of about 1⅞ inches diameter the crude zinc sulphide precipitate settles so as to yield more than 30 cc. and less than 90 cc. of clear supernatant liquor.

7. In the manufacture of zinc sulphide pigment by wet precipitation, in which a zinc salt solution is brought into repeated contact in general countercurrent flow with hydrogen sulphide gas with recirculation of the resulting slurry, the improvement which comprises regulating the efficiency of hydrogen sulphide gas absorption so that the concentration of hydrogen sulphide in the gas first contacting with freshly introduced zinc salt solution is at least 50%.

8. In the manufacture of zinc sulphide pigment by wet precipitation, in which a zinc salt solution is brought into contact with hydrogen sulphide gas with repeated contact of the resulting slurry with hydrogen sulphide gas in a series of closed tanks through which the slurry and gas pass in general countercurrently, the improvement which comprises regulating the absorption of hydrogen sulphide gas so that with an entering gas containing at least 99% H$_2$S the exiting gas contains at least 50% H$_2$S.

9. In the manufacture of zinc sulphide pigment, the step which comprises treating zinc sulphate solution with hydrogen sulphide gas by repeatedly recirculating said solution in intimate contact with hydrogen sulphide gas maintained at a concentration of at least 50% H$_2$S by volume.

10. In the manufacture of zinc sulphide pigment involving a reaction between a zinc salt solution and hydrogen sulphide gas having a concentration in excess of 50% H$_2$S, the improvement which comprises mixing the solution and the hydrogen sulphide gas intimately and maintaining the concentration of H$_2$S in the residual gas in excess of 50%.

11. In a method of making zinc sulphide pigment by the reaction between a zinc salt solution and hydrogen sulphide to form a slurry of crude zinc sulphide particles in liquid, the improvement which comprises intimately mixing the zinc salt solution with hydrogen sulphide gas maintained at a concentration in excess of 50% H$_2$S until the resulting crude zinc sulphide slurry is such that 30 to 60 ccs. of clear supernatant liquid will appear when 500 ccs. of the slurry are left standing for 10 minutes in a cylindrical graduate of about 1⅞ inches diameter.

12. In a method of making zinc sulphide pigment involving a reaction between a zinc salt solution and hydrogen sulphide with resultant formation of a slurry of crude zinc sulphide particles in liquid, said slurry being recirculated in contact with hydrogen sulphide, the improvement which comprises providing a ratio of gas to solution volume of between 25 and 50 to 1 and maintaining a predetermined ratio between the amount of slurry recirculated and the amount of slurry advanced.

13. In a method of making zinc sulphide pigment involving an intimate contact between a zinc salt solution and hydrogen sulphide with the resultant formation of a slurry of crude zinc sulphide particles in liquid, said slurry being in part recirculated in contact with hydrogen sulphide gas, the improvement which comprises providing a ratio of gas to solution volume of between 25 and 50 to 1 and maintaining a predetermined concentration of the hydrogen sulphide gas in contact with the solution during the period of contact.

14. In a method of making zinc sulphide pigment by a reaction between a zinc salt solution and hydrogen sulphide to form a slurry of crude zinc sulphide particles in liquid, the improvement which comprises intimately mixing the zinc salt solution with hydrogen sulphide gas maintained at a concentration in excess of 50% $H_2S$ until the resulting crude zinc sulphide slurry is such that more than 30 ccs. and less than 90 ccs. of clear supernatant liquid will appear when 500 ccs. of the slurry are left standing for 10 minutes in a cylindrical graduate of about 1⅞ inches diameter.

ARNE J. MYHREN.
BYRON MARQUIS.